United States Patent [19]
Corbett

[11] 3,857,702

[45] Dec. 31, 1974

[54] ELECTROSLAG REFINING FLUX COMPOSITIONS AND PROCESS FOR MAKING SAME

[75] Inventor: Paul M. Corbett, Baltimore, Md.

[73] Assignee: SCM Corporation, Cleveland, Ohio

[22] Filed: Oct. 26, 1971

[21] Appl. No.: 192,329

[52] U.S. Cl.................. 75/94, 75/10 C, 148/26
[51] Int. Cl............... C22d 7/00, C22d 9/10
[58] Field of Search............ 75/10, 11, 94, 5, 12; 148/26

[56] References Cited
UNITED STATES PATENTS

| | | | |
|---|---|---|---|
| 2,694,023 | 11/1954 | Hopkins | 75/12 |
| 2,823,112 | 2/1958 | Miller | 75/94 |
| 2,868,681 | 1/1959 | Shrubsall | 148/26 |
| 3,276,860 | 10/1966 | Lintz | 75/5 |
| 3,340,105 | 9/1967 | Ballass | 148/26 |
| 3,340,106 | 9/1967 | Ballass | 148/26 |
| 3,551,137 | 12/1970 | Bhat | 148/26 |
| 3,627,592 | 12/1971 | Schmidt | 148/26 |

FOREIGN PATENTS OR APPLICATIONS

| 979,583 | 1/1965 | Great Britain | 75/10 |
|---|---|---|---|

*Primary Examiner*—L. Dewayne Rutledge
*Assistant Examiner*—Peter D. Rosenberg
*Attorney, Agent, or Firm*—Thomas M. Schmitz

[57] ABSTRACT

An improved electroslag refining (ESR) flux composition and process for making same are shown. The instant ESR flux compositions are made from particulate batch materials providing at least alumina, a fluoride and alkaline earth metal oxide, including calcium oxide, by the process described to yield a product exhibiting a substantially uniform fusion characteristic and to be substantially free of contamination from outside sources. The improvement in process comprises subjecting a substantially homogeneous mixture of batch materials, advantageously pelletized, to heat reaction at a temperature short of their complete fusion and in the range of about 1,900°–2,400° F, generally most suitably until the free calcium oxide in the resulting product is below about 1½%.

10 Claims, No Drawings

ELECTROSLAG REFINING FLUX COMPOSITIONS AND PROCESS FOR MAKING SAME

This invention relates to an improved electroslag refining (ESR) flux composition and process for making same, and more particularly to such composition and process wherein undesirable consituents can be readily precluded or restricted to satisfactory low levels.

Generally in an ESR process an electrode of the metal to be thus refined is melted at the tip by resistance heating while partially immersed in a protective and purifying slag that is supernatant on a pool of molten, refined metal. The pool usually is supported by solidified, refined metal which also acts as the other electrode to complete the electrical circuit. U.S. Pat. No. 2,694,023 shows one form of the process. Other pertinent literature includes U.S. Pat. Nos. 3,067,473, 2,868,681, 3,551,137, and the Duckworth and Hoyle text Electroslag Refining, Richard Clay (The Chaucer Press) Ltd., Bungay, Suffolk, 1969.

Present fluxes to make such slag are of two types. Generally they comprise, in free or combined state, alumina, a fluoride, and alkaline earth metal oxide plus other minor ingredients. The lowest cost type is a mixture of discrete ingredient minerals which fuse in the ESR apparatus or are fused in a furnace in conjunction with the ESR unit and the molten flux is fed directly into the ESR unit. Because of the widely different melting temperatures of the ingredients, undesirable grossly non-uniform melting is to be expected with attendant bad effects on the metal, poor heat distribution, and impaired electrical conductivity. Additionally, such fluxes generally are fairly rich in free alkaline earth metal oxides; e.g., CaO, that tends to make them pronouncedly hydroscopic (which can impart hydrogen embrittlement to the metal in process). Their fineness also makes them undesirably dusty to handle.

The more costly improved ESR flux composition type is one in which all of the ingredients have been electrically prefused, typically at a temperature of about 2,450° F in a graphite crucible by means of induction or submerged arc melting. The resulting product is decidedly better than the simply premixed powder, but often loss of fluorine in such drastic fusion processes leaves an undesirable residue of free alkaline earth metal oxide, particularly in the presence of minor siliceous batch impurities, and this tends to impart a measure of undesirable hygroscopicity to the flux. Additionally, crucible graphite contamination can occur, and this generally is undesirable, particularly where extra low carbon content of the metal in process is essential.

The instant invention provides an economical ESR flux composition that is desirably extremely low or rid of free calcium oxide, has no objectionable carbon content, has substantially uniform melting characteristics, can be made inexpensively, and also can be made to resist dusting in handling.

One aspect of the invention is an improvement in ESR flux composition made of particles including combined or free alumina, a fluoride, and alkaline earth metal oxide, including calcium oxide. It comprises the substantially homogeneous, agglomerated, solid state heat reaction product of said particles short of their complete fusion, said reaction product having not more than about 1½% free calcium oxide and a substantially uniform fusion characteristic. Minor ingredients which may be necessary or desirable for the particular ESR process can be included without affecting the present process.

Another aspect of the invention is an improvement in process for making such ESR flux composition which comprises subjecting a substantially homogeneous mixture of batch materials providing the same to heat reaction at a temperature short of their complete fusion and in the range of about 1900° to about 2400°F. until the resulting composition has a substantially uniform fusion characteristi $\cdot$ The resulting pellets are essentially the same comp$\ldots$ on as the raw materials used to make them except for the loss of carbon dioxide, sulfur dioxide and water which results from the decomposition at elevated temperatures of carbonates, sulphates, etc., during calcination, which preferably is done in air. Thus, the impurities are controlled by the raw materials used and not by external conditions such as refractories, furnace atmospheres, etc.

The fusion characteristics of particles in a particular batch are substantially uniform; i.e., all pellets and pieces have a narrow fusion range which, for such particles as form a fluent melt at temperatures below 2,500° F. is less than 100° F. and generally not more than about 80° F., and which for such particles as form a fluent melt at temperatures of 2500° F. or higher, is less than about 200° F. and advantageously not more than about 150° F.

Although some ESR fluxes can be made from fluorides in conjunction with only an alkaline earth metal oxide, most ESR fluxes (slag compositions) also include alumina in their preparation.

Suitable alumina-providing materials for the practice of this invention include: mainly calcined alumina, but also aluminum fluoride to some extent. Suitable fluoride-providing materials include: preferably calcium fluroide but also magnesium fluorine, barium fluoride, and strontium fluoride and generally those fluorides which are stable at temperatures over 900° F. Batch materials do not include appreciable alkali metal compounds, excessive siliceous impurities, phosphorus, lead, or other metallurgically detrimental elements. Suitable alkaline earth oxide-providing materials include oxides and carbonates of calcium, barium, magnesium, strontium, and raw or burnt dolomite; barium and stronium compounds generally are used sparingly, because of cost, to control electrical properties if necessary.

Other batch materials that can and have been used for the instant purpose include zirconia, titanium dioxide, silicon dioxide. Generally, however, materials that provide vanadium, chromium, manganese, iron, cobalt, nickel, and copper are avoided because they can act as a medium for oxygen transfer in the ESR process. Advantageously, siliceous impurities in the finished slag are limited to provide no more than about 1.0% free or combined silica (calculated as $SiO_2$); similarly sulfur is limited to about 0.05%, and carbon to about 0.01%. Preferably such limits are 0.75%, 0.01%, and a trace; i.e., such less than 0.01%, respectively. Batch materials are conventional and are procured very low in or free of lead, phosphorus, zinc, and other elements, which are undesirable in the ESR process because of detrimental electrical and metallurgical effects. For example, sodium lowers the electrical resistance of the molten slag, and carbon drastically changes the hardness of ferrous alloys.

Surprisingly I have found that limestone (calcium carbonate) is an excellent batch material for my process as a source of calcium oxide, and better for my purpose than the commonly used calcium oxide. It appears to react faster and more completely in my process.

All batch materials should be fine enough to pass through a 100-mesh Tyler Standard sieve and preferably through a 200-mesh sieve before the blending and pelletizing steps to enhance the heat reaction. Batch mixing can be done in any conventional type blender.

The batch materials preferably are pelletized prior to calcining to obtain agglomerates 1/32 inch to ½ inch in the longest dimension so that after firing no vigorous crushing step will be needed and undesirable fines will thereby be minimized. Particle size can be thus controlled to meet the needs of feeding mechanisms used in ESR.

The pelletizing can be carried out by any conventional method. I have used a continuous disc-type pelletizer as well as a V-blender with a water-adding device for pelletizing. Water is a desirable pelletizing agent and in general, about 1% of fugitive binder advantageously is used; e.g., carboxymethyl cellulose, natural gums and the like. Pelletizing can be done economically with little or no pressure, or pressurized pelletizing can be practiced, if desired. For batch material preparation, pelletizing is preferred to achieve close proximity of the interacting batch materials, to facilitate the heat reaction, and to give a flux product that can be easily handled, stored and transported without excess formation of fines.

The heat reaction of the batch materials is performed at temperatures in the approximate range of 1,900° to 2,400° F. with soaking time of about ½ to 5 hours. The particular time and temperature of calcination is chosen so as to make product of desired specification while suppressing substantial formation of liquid phase from the components present. The desired composition and the impurities tolerable therein largely dictate the firing time and temperature. The exemplary compositions set forth herein require, in a static type of calcination, calcining temperature between about 2,100° F. and about 2,350° F.; their preferred soaking times are between about 2 and about 4 hours. It is important to provide adequate heating time and temperature to obtain substantially complete interaction while precluding the melting of the bulk of the components present. The time of calcination will vary with choice and amounts of batch materials, and with the heat exchange capacity of the furnace. Such time ("dwell time") will be less in a rotary kiln than in a tunnel kiln.

The following examples show ways in which this invention has been practiced, but should not be construed as limiting the invention. In this specification all temperatures are in degrees Fahrenheit, all percentages are weight percentages, and all parts are parts by weight, unless otherwise expressly indicated.

EXAMPLE 1

A flux composition suitable for ESR processing of metal was made as follows:

70 parts minus 100 mesh acid-grade fluorspar containing 97.5% $CaF_2$, 15 parts minus 325 mesh calcined alumina containing 99.5% $Al_2O_3$, 27 1/2 parts of finer than 200 mesh whiting containing 99.7% $CaCO_3$, and about 1 part of carboxymethyl cellulose binder were blended together for 35 minutes in a V-blender. The resulting intimate and thoroughly mixed blend of batch ingredients then was pelletized in a V-blender with the addition of 21 parts water to promote pellet formation. The pellets, predominantly 1/16 inch to ½ inch in their longest dimension, then were put into ordinary fireclay refractory saggers where they were calcined in a tunnel kiln at 2,200° F, being soaked at this temperature for approximately 3 hours.

The saggers then were sufficiently cooled in air to be handled and their contents then dumped into metal drums (which were covered to minimize moisture pickup) for further cooling. Pieces of the calcined product were slightly sintered together, but these were easily broken up to the original pellet sizes by handling impact. The light gray-colored pellets of this batch measured 1/16 inch to ½ inch in their longest dimension and fused completely between 2,400° and 2,475° F. as a very fluid melt. They had the following analysis: 70% $CaF_2$, 15% $CaO$, and 15% $Al_2O_3$. Free calcium oxide was estimated by weight gain tests to be less than 1%. This involved exposure of finely ground flux composition (finer than 100 and coarser than 200 mesh) to a humid atmosphere at about 400° F; the resulting weight increase was assumed to be the result of free CaO being slaked to form $Ca(OH)_2$.

EXAMPLE 2

A flux composition was made as follows using the same kinds of batch materials described in Example 1:

15 parts fluorspar, 40 parts calcined alumina, and 82½ parts whiting and 1 part of carboxyl methyl cellulose, when combined and heat reacted as described in Example 1, yielded pellets measuring 1/16 inch to ⅝ inch in their longest dimension which had the analysis: 15% $CaF_2$, 45% $CaO$, and 40% $Al_2O_3$. Free calcium oxide was determined by weight gain experiments described in Example 1, and found to be less than 0.75%. The product flux was found to be very suitable in a commercial ESR test. It fused in a narrow range between 2,600° and 2,750° to yield a very fluid melt.

EXAMPLE 3

A suitable flux composition for ESR processing of metal was made as follows using the same kind of batch materials described in Example 1.

40 parts fluorspar, 30 parts calcined alumina, 55 parts whiting, and 1 part carboxyl methyl cellulose were treated and heat reacted as in Example 1 to yield a 1,000-pound batch of ESR flux which fused in a narrow range between 2,500° and 2,650° F. to yield a very fluid melt and had the analysis: 40% $CaF_2$, 30% $CaO$, and 30% $Al_2O_3$. Free calcium oxide was found to be less than 1.5% as determined by weight gain experiments described in Example 1.

EXAMPLE 4

The following tests, using the same kinds of batch materials as described in Example 1, show the importance of fluoride in the practice of the instant invention:

51.5 parts calcined alumina, 89.0 parts whiting, and 1 part carboxyl methyl cellulose as binder were combined and heat treated as in Example 1 at a temperature of 2,200° to 2,300° F. with a 3-hour soak period. X-ray diffraction analysis of this flux showed all the resulting CaO and $Al_2O_3$ remained virtually unreacted.

This experiment was repeated with the addition of 4 parts technical grade aluminum fluoride (analysis: 95% $AlF_3$) and lowering of calcined alumina to 48 parts. Surprisingly, the ESR flux produced with the $AlF_3$ added contained less than 3% uncombined CaO (as determined by weight gain experiments described in Example 1) and less than 5% uncombined $Al_2O_3$, as shown by X-ray diffraction analysis. The principle crystalline compound present, shown by X-ray diffraction, had a formula of $12 CaO \cdot 7 Al_2O_3$.

From the foregoing examples it can be seen that completeness of reaction can be determined by the amount of free CaO remaining, providing the weight ratio of equivalent CaO to equivalent $Al_2O_3$ in the batch is less than unity. In most ESR fluxes, it is desirable to form, in addition to recrystallized $CaF_2$, as much of the compound $12 CaO \cdot 7 Al_2O_3$ as possible to minimize the occurrence of face CaO. X-ray diffraction analysis of a commercial, totally electrically fused ESR flux, shows the presence of crystalline $CaF_2$, $12 CaO \cdot 7 Al_2O_3$, and some free CaO. The instant invention produced the same crystalline compounds, but with a lesser proportion of free CaO.

What is claimed is:

1. In a process for producing an electroslag refining flux composition from particulate batch materials which includes alumina, fluoride, and alkaline earth metal oxide, including calcium oxide, the improvement which comprises:

forming an agglomerated substantially homogeneous mixture of said batch materials at a heat reaction temperature of about 1,900°–2,400° F, but less than the fusion temperature of said batch materials, until a flux composition is formed having a substantially uniform fushion range of less than 150° F and containing less than about 1.5% by weight of free, uncombined calcium oxide.

2. The process of claim 1 wherein the batch materials are solids having particle size finer than 60 mesh, and the free calcium oxide content in the resulting composition is not substantially above about 1½%.

3. The process of claim 1 wherein the batch materials comprise fluorspar, calcium carbonate, and alumina.

4. The process of claim 3 where aluminum fluoride is at least partially substituted for flurospar and alumina.

5. The process of claim 3 where the batch materials also contain magnesium oxide.

6. The process of claim 1 where the batch materials are agglomerated to a predetermined size prior to their heat reaction.

7. An electroslag refining flux composition made of particles including combined or free alumina, a fluoride, and alkaline earth metal oxide, including calcium oxide, the improvement which comprises the substantially homogeneous solid state heat reaction product of said particles at temperatures of 1,900° to 2,400° F, said heat reaction product being unfused and agglomerated, said reaction product having less than 1.5% by weight free, uncombined calcium oxide, and said reaction product having a substantially uniform fushion range of less than 150° F.

8. The composition according to claim 7 wherein silica is limited to about 1%, sulfur to about 0.05%, and carbon to about 0.01%.

9. The composition according to claim 8 wherein silica is not substantially above about 3/4%, sulfur not substantially above about 0.01%, and carbon not substantially more than a trace.

10. The composition according to claim 7 wherein the product agglomerates are between about 1/32 inch and about ½ inch in their longest dimension.

* * * * *